United States Patent [19]

Curtiss, Jr. et al.

[11] 4,248,286
[45] Feb. 3, 1981

[54] SAFETY SUPPORT ASSEMBLY FOR PNEUMATIC TIRES

[75] Inventors: Walter W. Curtiss, Jr., Akron; Grover W. Rye, Cuyahoga Falls, both of Ohio

[73] Assignee: The Goodyear Tire & Rubber Company, Akron, Ohio

[21] Appl. No.: 920,667

[22] Filed: Jun. 30, 1978

[51] Int. Cl.$^3$ ............................................. B60C 17/04
[52] U.S. Cl. ............................ 152/158; 152/330 RF
[58] Field of Search ......... 152/158, 157, 155, 330 RF, 152/330 L

[56] References Cited

U.S. PATENT DOCUMENTS

| | | | |
|---|---|---|---|
| 1,365,539 | 1/1921 | Pepple | 152/326 |
| 2,067,545 | 1/1937 | Ricketts, Jr. | 152/158 X |
| 2,742,941 | 4/1956 | Johnson | 152/326 |
| 2,989,108 | 6/1961 | Gore | 152/158 |
| 3,250,310 | 5/1966 | Johnson | 152/158 |
| 3,397,728 | 8/1968 | McCrary et al. | 152/158 |
| 3,509,928 | 10/1967 | Aghnides | 152/158 |
| 3,999,585 | 12/1976 | Grawey | 152/361 R |
| 4,163,466 | 8/1979 | Watts | 152/158 |

FOREIGN PATENT DOCUMENTS 2355453  5/1975  Fed. Rep. of Germany ........... 152/158
22106 of 1892  United Kingdom .

Primary Examiner—John J. Love
Assistant Examiner—D. W. Underwood
Attorney, Agent, or Firm—Frank Pincelli; Frederick K. Lacher

[57] ABSTRACT

A safety support mounted on a rim inside a tire chamber to resiliently support the tread portion of the tire in the deflated condition and maintain the bead portions of the tire in a separated condition. The support is in the form of a ring member of flexible resilient material with an inner portion at the inner periphery having a diameter not greater than the diameter of the rim and a width substantially the same distance between the bead portions when mounted on the rim. The ring member also has an outer portion at the outer periphery with an outer diameter less than the diameter of the tread portion of the tire in the inflated condition and greater than the diameter of the bead portions. The outer portion and inner portion of the ring member are connected by an intermediate portion which includes a plurality of radially extending webs spaced apart circumferentially of the ring member. The outer portion and inner portion are reinforced by annular plies which may be of bias fabric and helically wound cords.

11 Claims, 6 Drawing Figures

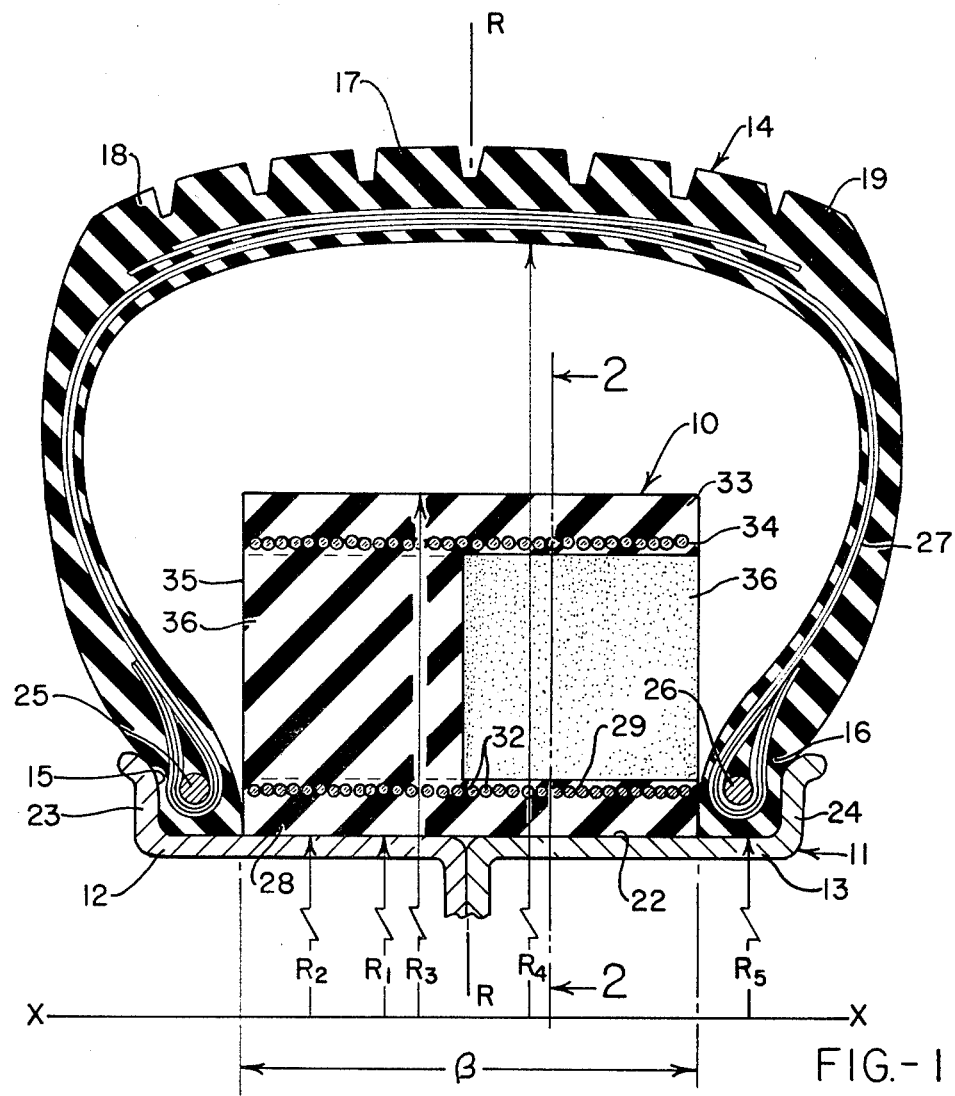
FIG.-1
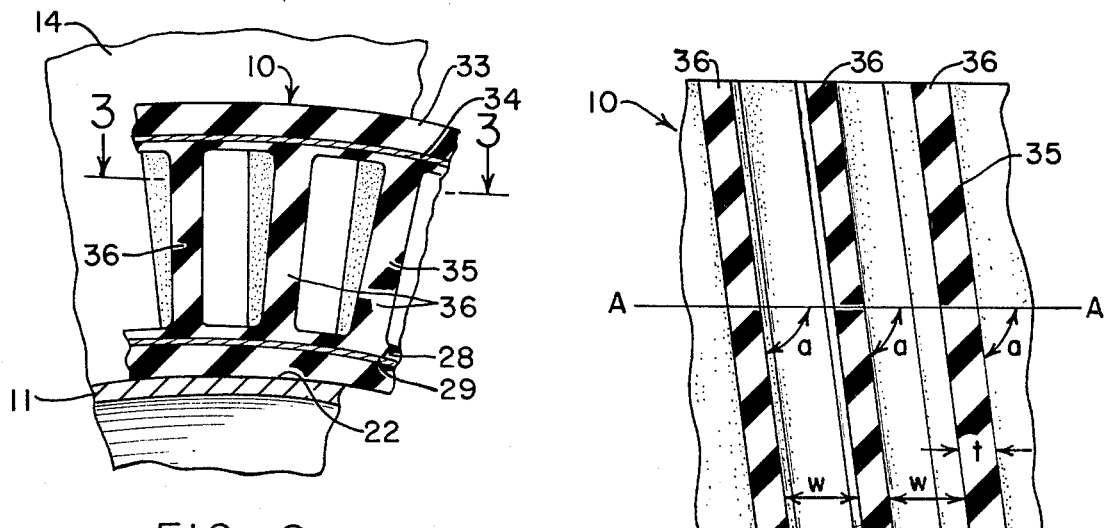
FIG.-2
FIG.-3

SAFETY SUPPORT ASSEMBLY FOR PNEUMATIC TIRES

This invention relates generally, as indicated, to a safety support and bead separator for use on a wheel rim inside the tire chamber to support and cushion the tire in a deflated condition.

Heretofore different types of supports have been proposed for supporting tires in the deflated run-flat condition. These have included rigid rings, resilient reinforced resin rings with a C-shaped cross section and buffer rings of rubber or other cushioning material mounted on the wheel rim. Problems have been had with the rigid rings because of their limited cushioning ability and problems have been had with the buffer rings because of the lack of stability and driving control characteristics of these rings. Supports have also been proposed with cicumferentially extending walls for drop center rims which has limited the flexibility of the supports due to the restricting position of the walls.

With the foregoing in mind it is the principal object of this invention to provide a safety support assembly in which the safety support is mounted on a wheel rim within a pneumatic tire for supporting a vehicle upon deflation of the tire.

Another object of the invention is to provide a safety support with desirable load deflection characteristics to absorb energy and prevent shock transmission to the axle and vehicle while at the same time maintaining vehicle control.

A further object is to provide flexibility and resiliency for cushioning and insertion of the safety support through the beads of the tire during installation and removal of the safety support.

A still further object is to provide reinforcing cords in the support for retaining the support on the rim and providing the desired load-carrying capacity and spring rates.

Another object is to provide a safety support for separating the beads of the tire and maintaining the separation during operation in the deflated condition of the tire.

A further object is to provide cushioning with a configuration in which the cushioning members are separate, unconnected and spaced apart to decrease the weight and increase the resiliency.

A still further object is to provide a support having a sufficient width to separate the bead portions of the tire while at the same time provide shoulder support of the tire in the deflated condition.

These and other objects of the invention are provided by a safety support ring having inner and outer portions reinforced by plies of reinforcing cords. A cushioning intermediate portion of the ring member is interposed between the belts and has a relatively lightweight resilient configuration. The safety support ring has a width sufficient for maintaining the separated positions of the tire bead portions and supporting the shoulders of the tire in the deflated condition.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but some of the various ways in which the principles of the invention may be employed.

In the annexed drawings:

FIG. 1 is a cross-sectional view of an annular safety support ring mounted on a wheel rim inside a tire chamber, the connection of the rim to the supporting wheel not being shown.

FIG. 2 is a fragmentary sectional elevation taken along the plane of line 2—2 in FIG. 1.

FIG. 3 is a plan view in section of a portion of the safety support taken along the plane of line 3—3 in FIG. 2.

Figure 4:
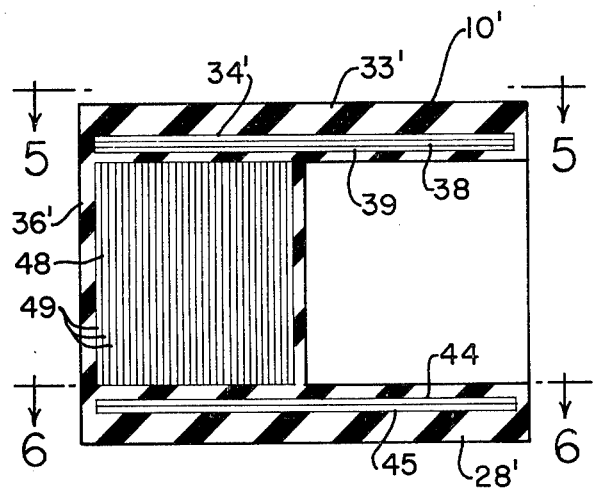
FIG. 4 is a cross-sectional view like FIG. 1 of a modification of the safety support ring of the invention.

Referring to FIG. 1, a safety support in the form of a generally cylindrical ring member 10 is shown mounted on an annular wheel rim 11. The rim 11 is part of a wheel of a type well known in the art but not shown in this drawing. The rim 11 is of a split-rim type having two sections 12 and 13 which are joined at a plane R—R perpendicular to an axis X—X of the rim and ring member 10. Bolts or other fasteners (not shown) for clamping the rim sections 12 and 13 together are of a type well known in the art.

A pneumatic tire 14 is mounted on the rim 11 and has a first bead portion 15 at one edge and a second bead portion 16 at the other edge. The tire 14 also has a tread portion 17 at the crown of the tire and shoulder portions 18 and 19 at the edges of the tread portion.

The rim 11 has a generally cylindrical surface 22 with a first side flange 23 on the rim section 12 and a second side flange 24 on the rim section 13. The first bead portion 15 is seated on the cylindrical surface 22 against the first side flange 23 and the second bead portion 16 is seated on the cylindrical surface against the second side flange 24.

The tire 14 is of a type which is inflatable without a tube and may be of a radial, bias-belted or bias ply construction. A valve (not shown) may be provided in the rim 11 for communicating an inflating fluid to the chamber within the tire 14. A suitable opening (not shown) may be provided in the ring member 10 for communicating the inflating fluid through the ring member to the valve. As shown in FIG. 1, the first bead portion 15 has a circumferentially extending bead 25 and the second bead portion 16 has a circumferentially extending bead 26 around which plies 27 extend.

Referring to FIGS. 1 through 3, the ring member 10 is of a suitable resilient material such as rubber or urethane and has an inner portion or cylindrical inner band 28 at the inner periphery having a radius R1 slightly less than the radius R2 of the cylindrical surface 22 of the rim 11 to provide compression loading on the rim for resisting movement of the ring member during operation. The inner band 28 may also have a width B measured in a direction axially of the ring member 10 which is substantially the same as the distance between the first bead portion 15 and second bead portion 16. The inner band 28 is reinforced by an inner belt 29 extending circumferentially of the band. The inner belt 29 may be of a high modulus reinforcing material such as steel and have cords 32 helically wound around the inner band 28 in side-by-side relationship and extending across the width of the inner band.

The ring member 10 also has an outer portion or cylindrical outer band 33 at the outer periphery spaced from the inner band 28 and having an outer radius R3 which is less than the radius R4 of the tread portion 17 in the inflated condition and greater than the radius R5 of the bead portions 15 and 16. The width of the outer band 33 is substantially the same as the width B of the inner band 28. The outer band 33 is reinforced by a circumferentially extending outer belt 34 of a high modulus reinforcing material such as steel. In the embodiment shown, the outer belt 34 is made up of a plurality of circumferentially extending cords in side-by-side relationship and helically wound around the ring member 10. The outer belt 34 extends across the width B of the outer band 33.

Integral with and interposed between the inner band 28 and outer band 33 is an intermediate load-carrying and cushioning portion such as annular support 35 which in this embodiment has a structure with a plurality of separate, unconnected radially extending webs 36. The webs 36 also extend in a generally axial direction relative to the ring member 10 and each of the webs may be tilted relative to the axis X—X of the ring member at an angle (a) to a plane A—A perpendicular to the axis of the ring member 10. Preferably, each of the webs 36 is positioned at the same angle (a) with respect to the plane A—A. As shown in FIG. 3, the webs 36 have a thickness (t) measured in the circumferential direction not greater than the width (w) between the webs measured circumferentially of the ring member 10.

In operation, upon deflation of the tire 14 the tread portion 17 will engage the outer band 33 as the tire rotates under the weight of the vehicle. A lubricant within the tire chamber facilitates relative movement of the inner surface of the tread portion 17 and the surface of the outer band 33. The webs 36 will be deflected and provide cushioning of the vehicle. At the same time the outer belt 34 will reinforce the outer band 33 providing a stability which controls the cushioning reaction of the ring member 10 and facilitates the control of the vehicle.

In addition to providing a cushioning support for the vehicle when the tire 14 is in the deflated condition, the ring member 10 also maintains the bead portions 15 and 16 in a separated condition by the positioning of the inner band 28 containing the inner belt 29 between the bead portions. This is important to maintain the tire in a shape in which maximum control is possible. Also the positioning of the bead portions 15 and 16 contributes to the support of areas of the shoulders 18 and 19 and tread portion 17 which contact the outer band 33 of the ring member 10. This provides the necessary support for vehicle control and prevents damage to the tire 14 while the vehicle is being driven to a point where the tire can be repaired.

To install the ring member 10, the sections 12 and 13 of the rim are separated. The ring member 10 is then deformed by bending the inner band 28 and outer band 33 for insertion through either the first bead portion 15 or the second bead portion 16. The tire 14 containing the ring member 10 is then slipped over the section 12 of the rim with the bead portion 15 against the first side flange 23 and the inner band 28 stretched in a condition of compression loading on the cylindrical surface 22. Next the other section 13 of the rim 11 is inserted in the ring member 10 and the tire 14 with the remainder of the inner band 28 stretched over the cylindrical surface 22 in a condition of compression loading and the bead portion 16 urged against the second side flange 24. In this process the valve is aligned with the opening in the ring member 10. The sections 12 and 13 of the rim 11 are then bolted together and the tire 14 inflated. The disassembly of the tire 14, ring member 10 and rim 11 is accomplished by reversing the process of assembly described above.

Figure 5:
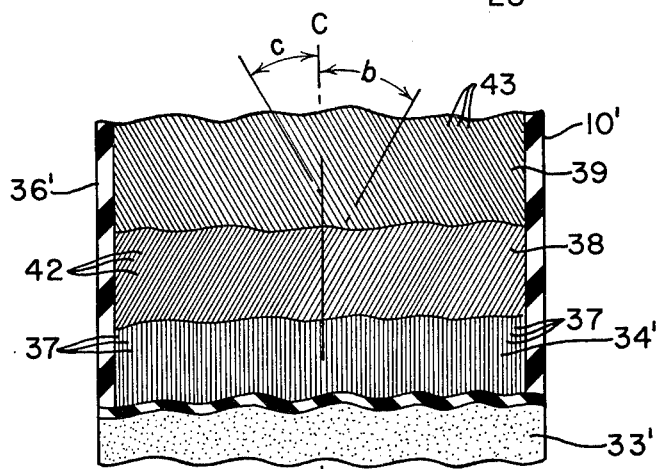
FIG. 5 is a fragmentary view taken along the cylindrical plane of line 5—5 in FIG. 4 with parts being broken away to show the cords in the plies of the outer band.
Figure 6:
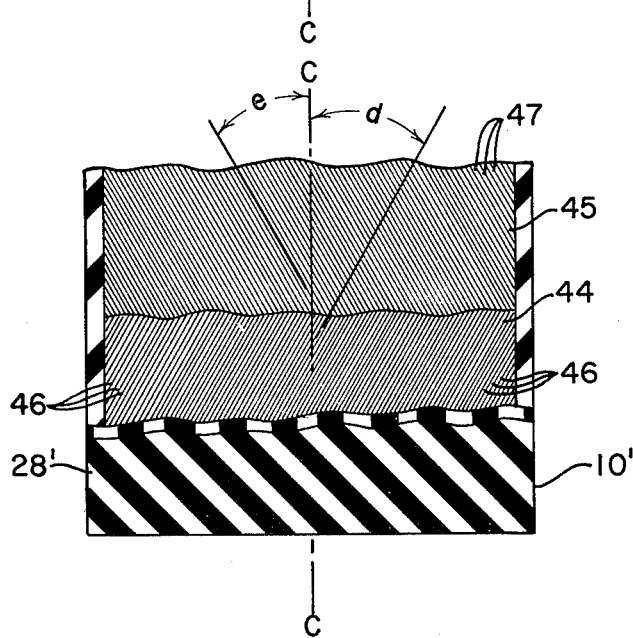
FIG. 6 is a fragmentary sectional view taken along the cylindrical plane 6—6 in FIG. 4 with parts being broken away to show the cords in the plies of the inner band.

Referring to FIGS. 4, 5 and 6, a modification of the invention is shown in which the ring member 10' has a cylindrical outer band 33' with an outer belt 34' of circumferentially extending cords 37 which may be helically wound or have cords at an angle of 0° to a circumferential centerline C—C of the ring member 10' as shown in FIGS. 5 and 6.

Radially inward of the outer belt 34' are two circumferentially extending reinforcing plies 38 and 39 of bias fabric embedded in the outer band 33'. The reinforcing plies 38 and 39 preferably have cords 42 and 43, respectively, extending in opposite directions at angles (b) and (c) to the circumferential centerline C—C as shown in FIG. 5. In the embodiment shown, the cords 42 and 43 are of 840/2 nylon and are positioned at angles (b) and (c) of around 26°.

As shown in FIGS. 4 and 6, the cylindrical inner band 28' is reinforced by two circumferentially extending reinforcing plies 44 and 45 of bias fabric. The reinforcing plies 44 and 45 may have cords 46 and 47, respectively, extending in opposite directions at angles (d) and (e), respectively, to the circumferential centerline C—C of the ring member 10' as shown in FIG. 6. Preferably, the cords 46 and 47 are at angles (d) and (e) of from 10° to 35° to the circumferential centerline C—C and in this embodiment are at angles of around 26°. The cords 46 and 47 may be of a suitable reinforcing material such as 840/2 nylon.

Each of the webs 36' has a reinforcing ply 48 of reinforcing cords 49 which extend generally in a direction radially of the ring member 10'. These cords 49 may also be of a suitable reinforcing material such as 840/2 nylon.

The ring member 10' may be made of a suitable resilient material such as rubber or urethane and the modification shown in FIGS. 4, 5 and 6 is of rubber. In operation this ring member 10' is used in substantially the same manner described for the embodiment shown in FIGS. 1, 2 and 3.

While certain representative embodiments and details have been shown for the purpose of illustrating the invention, it will be apparent to those skilled in the art that various changes and other modifications may be made therein without departing from the invention. These changes may include using more than one ring member 10 between the the bead portions 15 and 16 or using a spacer between the ring members so that the ring members engage the shoulders 18 and 19 of the tire 14 in the deflated condition. Also the configuration of the webs 36 in the annular support may be varied and other radial supports and configurations may be substituted for the webs to provide the necessary cushioning and control.

What is claimed is:

1. A safety support assembly comprising a wheel rim, a pneumatic tire of the type having a tread portion and bead portions, a cylindrical surface on said rim, said bead portions being mounted on said cylindrical surface, a generally cylindrical ring member of flexible resilient material having an inner cylindrical band at the inner periphery with an inner diameter not greater than the diameter of said cylindrical surface for mounting said ring member on said rim, said ring member having an outer cylindrical band at the outer periphery spaced from said inner cylindrical band and having an outer diameter less than the diameter of said tread portion of the tire in the inflated condition and greater than the diameter of said bead portions, said ring member being engageable by said tread portion in the deflated condition of said tire, an intermediate portion of said ring member between said inner band and said outer band, said intermediate portion including separate unconnected radially extending webs spaced apart circumferentially of said ring member, said outer band including a first circumferentially extending annular belt having reinforcing cords of high modulus material, said inner band including a second circumferentially extending annular belt of reinforcing cords of high modulus material and having a width measured axially of said ring member substantially equal to the distance separating said bead portions of said tire mounted on said rim so that said inner band is confined between said second circumferentially extending annular belt, said cylindrical surface of said rim and said bead portions.

2. A safety support assembly according to claim 1 wherein said inner diameter of said inner band is less than the diameter of said cylindrical surface whereby there is compression loading of said support on said wheel rim.

3. A safety support assembly according to claim 1 wherein said cords of said first and second annular belts are helically wound around said ring member.

4. A safety support assembly according to claim 1 wherein said rim is split in two pieces along a plane perpendicular to the axis of said wheel rim and said inner band and said outer band of said ring member being bendable for inserting in said tire through at least one of said bead portions.

5. A safety support assembly according to claim 1 wherein said width of said outer band in the axial direction is substantially the same as said width of said inner band in the axial direction.

6. A safety support assembly according to claim 1 wherein said outer band further includes two circumferentially extending reinforcing plies of bias fabric.

7. A safety support assembly according to claim 6 wherein said plies of bias fabric have cords positioned at an angle of from 10 to 35 degrees to the circumferential centerline of said ring member.

8. A safety support assembly according to claim 1 wherein said annular belt of said inner band includes two circumferentially extending reinforcing plies of bias fabric.

9. A safety support assembly according to claim 1 wherein each of said webs includes a ply of reinforcing cords.

10. A safety support assembly according to claim 9 wherein said reinforcing cords of said ply reinforcing said web extend generally in a direction radially of said ring member.

11. A safety support assembly according to claim 6 wherein said annular belt of said inner band includes two circumferentially extending reinforcing plies of bias fabric and each of said webs includes a ply of reinforcing cords extending generally in a direction radially of said ring member.

* * * * *